United States Patent [19]

Pate

[11] 4,041,394
[45] Aug. 9, 1977

[54] RADIO CONTROL TRANSMITTER

[75] Inventor: Ronald W. Pate, District of Algoma, Canada

[73] Assignee: River Range Developments Limited, Sault Ste. Marie, Canada

[21] Appl. No.: 703,062

[22] Filed: July 6, 1976

[51] Int. Cl.$^2$ .......................................... H04B 1/04
[52] U.S. Cl. ................................. 325/102; 325/118; 325/119; 343/228
[58] Field of Search .................. 325/16, 37, 102, 111, 325/118, 119, 149; 343/225, 227, 228; 340/416, 224, 277, 321; 200/DIG. 2

[56] References Cited

U.S. PATENT DOCUMENTS

| 2,106,658 | 1/1938 | Rakos | 340/277 |
|---|---|---|---|
| 2,285,083 | 6/1942 | Cover, Sr. | 325/16 |
| 3,315,263 | 4/1967 | Lefevre | 325/16 |
| 3,440,635 | 4/1969 | Hull | 325/118 |
| 3,466,609 | 9/1969 | Öhlund | 343/225 |
| 3,530,451 | 9/1970 | Devine | 340/224 |
| 3,868,573 | 2/1975 | Holcomb et al. | 325/16 |

Primary Examiner—Robert L. Griffin
Assistant Examiner—Marc E. Bookbinder
Attorney, Agent, or Firm—Ridout & Maybee

[57] ABSTRACT

In order to facilitate operation of a radio remote control transmitter, the transmitter components are built into the structure of a vest-like garment, and the transmitter is operated by placing a magnet on the wrist of the user adjacent one of a number of reed switches built into the vest at spaced locations so as to cause the transmitter to radiate different control signals according to the switch which is actuated.

11 Claims, 4 Drawing Figures

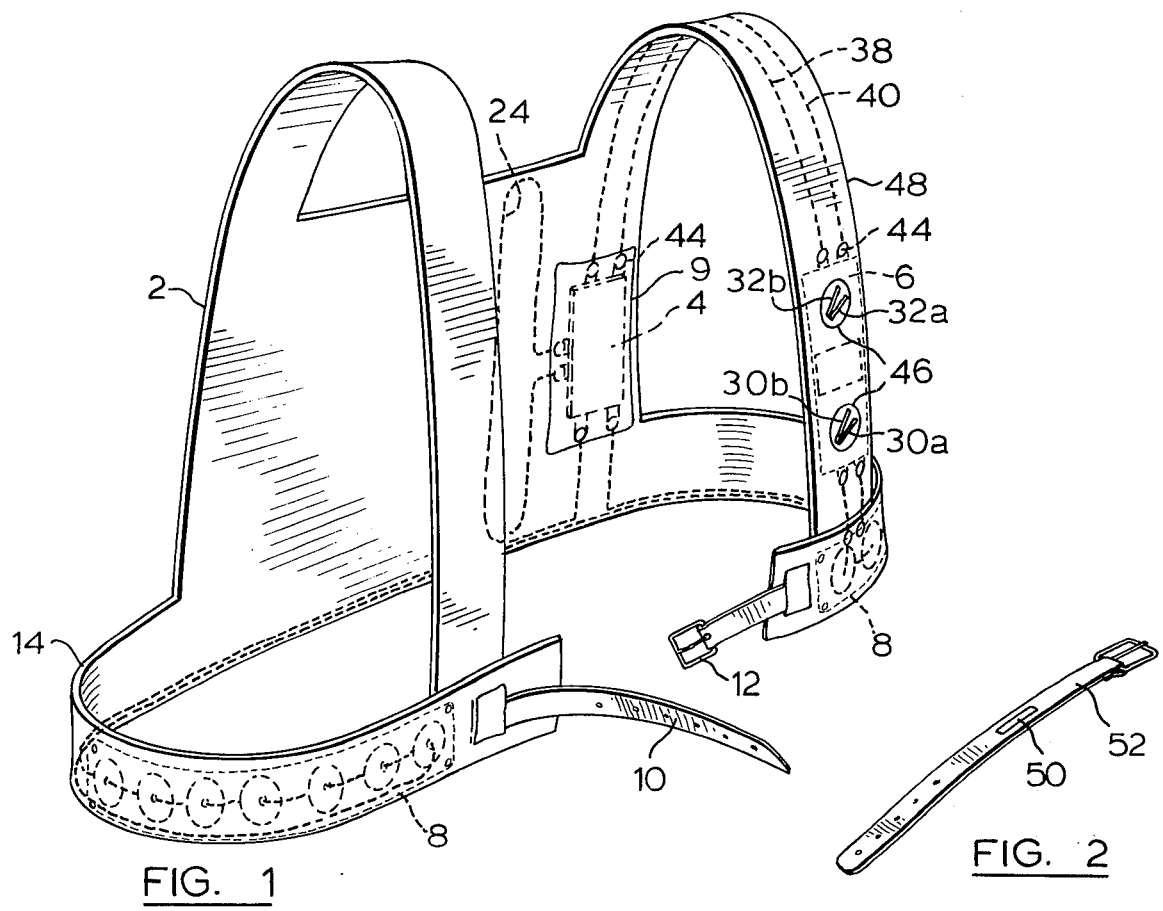
FIG. 1
FIG. 2
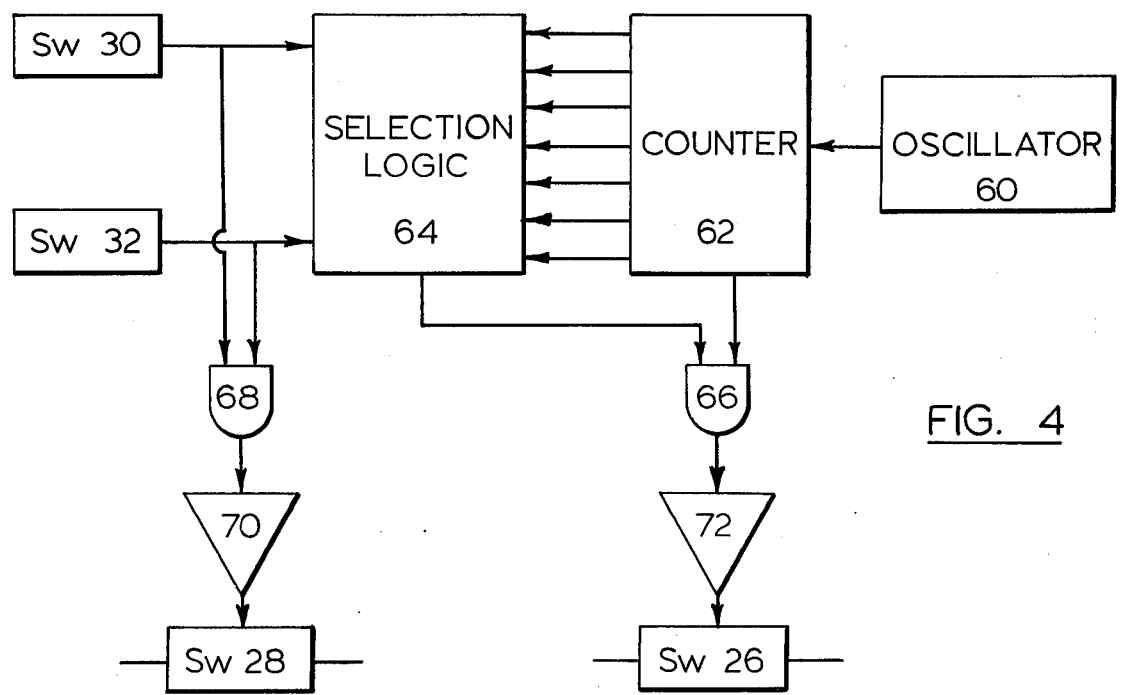
FIG. 4

RADIO CONTROL TRANSMITTER

FIELD OF THE INVENTION

This invention relates to radio remote control transmitters of the type transmitting a number of different switch selected control signals so as to control functions of equipment situated at a remote location and provided with a suitable receiver.

BACKGROUND OF THE INVENTION

The problems, to the solution of which the present invention is directed, are best understood by reference to a specific example.

In one method of harvesting trees, a tree feller moves through an area felling and limbing trees selected for cutting. A diesel-powered log-skidder, equipped with a winch, is utilized to collect together several of the logs produced by the felling operation using the winch cable and choker cables to drag the logs towards the skidder, which then skids the entire bundle of collected logs out to a "landing" for subsequent collection and trucking to a sawmill.

Operation of such a log-skidder requires that the operator position the vehicle within a winch cable length of the logs to be collected. The operator then releases a drum brake on the winch, descends from the vehicle and carries a choker cable towards a first log, whilst dragging the winch cable from the drum. Having positioned the choker cable around the log and attached the winch cable, the operator must then return to the machine, manipulate a control to start the winch and drag the log to a selected bundling position, and stop the winch. This sequence must be repeated for each of the logs to be collected and for the application of a choker cable to the completed bundle prior to towing it to the landing.

The physical exertion involved for the skidder operator is considerable. The floor of the cab of a typical skidder is about 5 feet above ground level which necessitates a vertical climb and descent via precarious handholds and steps. A bundle of five logs will necessitate at least six round-trips between logs and vehicle, and possibly more since choker cables sometimes slip off logs and must therefore be reset. This is an energy and time consuming task, especially in adverse weather conditions such as deep snow. The rigour of the task can be alleviated by using a crew of two, but this is obviously an expensive solution to the problem.

A system of remote control which permits the operator to exercise all the functions of the winch (brake release, apply brake and rewind) without returning to and mounting the vehicle is obviously highly desirable so as to save the necessity for a second operator, or to save time and physical exertion on the part of a single operator.

Use has been made of relatively conventional radio remote control equipment with a view to overcoming the problems outlined above. However, conventional radio control equipment is not ideal for the purpose. Conventional transmitter units, although they can be quite small in size, are nevertheless an additional encumbrance for the operator, and since the transmitter must be housed in a readily accessible position, it is also very vulnerable to accidental damage and in particular to accidental transmission of control signals under inevitably rough conditions of usage. Moreover, it is difficult for an operator wearing the heavy gloves necessary for the job to operate the controls of such a transmitter. Unfortunately, the more compact the transmitter, the more difficult the controls are likely to become to manipulate.

The present invention is directed toward providing a remote control transmitter which eliminates the need for manipulating controls in order to transmit the several different required signals, which is not cumbersome to carry, and which much reduces the possibility of accidental damage or transmission.

The invention also seeks to alleviate certain other problems which have become apparent with prior art remote control transmitter apparatus. Firstly, it is common for a number of log skidders to be operating in the same area. It is therefore of great importance that the receiver on a particular skidder should respond only to the transmitter of its operator, because of the risk of accidents that would otherwise arise. Secondly, it is important to secure reliable transmission over a sufficient distance to ensure reliable reception, regardless of the position or attitude of the operator, who will often not be facing the receiver when he operates the transmitter. With a conventional transmitter, operated in front of the body, this means that the user's body is interposed between the transmitter and the receiver. Whilst this may not itself cause sufficient attenuation of the transmitted signal to prejudice the reliability of reception, the user's body may interact with the transmitter antenna in such a manner as to cause nulls in the radiation pattern of the transmitter. Moreover, even without interaction with the body of the user, the antenna may have nulls in its radiation pattern, and it is difficult to ensure that the transmitter is never held so that the receiver lies in such a null.

SUMMARY OF THE INVENTION

According to the invention in its broadest aspect, a radio remote control transmitter assembly comprises an antenna, a transmitter means connected to the antenna to supply a radio frequency signal thereto, means to modulate the radio frequency signal supplied by the transmitter means, a source of electrical energy, switching means, and encoder means selectively supplying any of a plurality of distinctive modulating signals to the modulating means in response to different conditions of said switching means, wherein the components comprised by the transmitter are incorporated into the structure of a vest-type garment, and the switching means comprises a plurality of switches located by said garment at spaced locations relative to the trunk of a user, said switches being of a non-manipulatory type selectively operable by juxtaposition of another portion of the user's body with said locations on the user's trunk.

By "vest-type garment" is meant any garment suitable for wearing on the upper trunk of a user. A preferred form of garment is a brightly coloured safety vest such as is commonly worn by many outside workers to improve their visibility for safety reasons. However, other types of garment could be employed, including skeleton garments whose main purpose is to support the various transmitter components rather than to clothe the wearer.

The use of magnetic reed switches, operated by a wrist mounted magnet, as the non-manipulatory switches is preferred, since this arrangement maximizes the ease of operation and minimizes the chance of accidental operation of the switches. Moreover, such switches are highly reliable and are hermetically sealed. Thus whilst pressure or proximity switches could be utilized, the operation of both of these could be affected for example by the weight of clothing worn by a user above the vest-like garment, and both would respond to the pressing of objects or parts of the body other than the designated part of the body against the switch: moreover, such switches might prove less weatherproof than reed switches.

By incorporating the antenna in the garment, its relationship to the user's body is substantially predetermined. This helps in maintaining reliable communication with the receiver, since the antenna can be arranged so as to avoid deep nulls in its directional characteristics, even when the body of the user is interposed between the antenna and the receiver.

BRIEF DESCRIPTION OF THE DRAWINGS

The invention is described further with reference to the accompanying drawings, in which FIG. 1 is a perspective view showing the mechanical construction of a transmitter in accordance with the invention, FIG. 2 is a perspective view of a magnet bearing wristband used in conjunction with the transmitter, and FIGS. 3 and 4 are block diagrams illustrating the electronic construction of the transmitter.

DESCRIPTION OF THE PREFERRED EMBODIMENT

Figure 3:
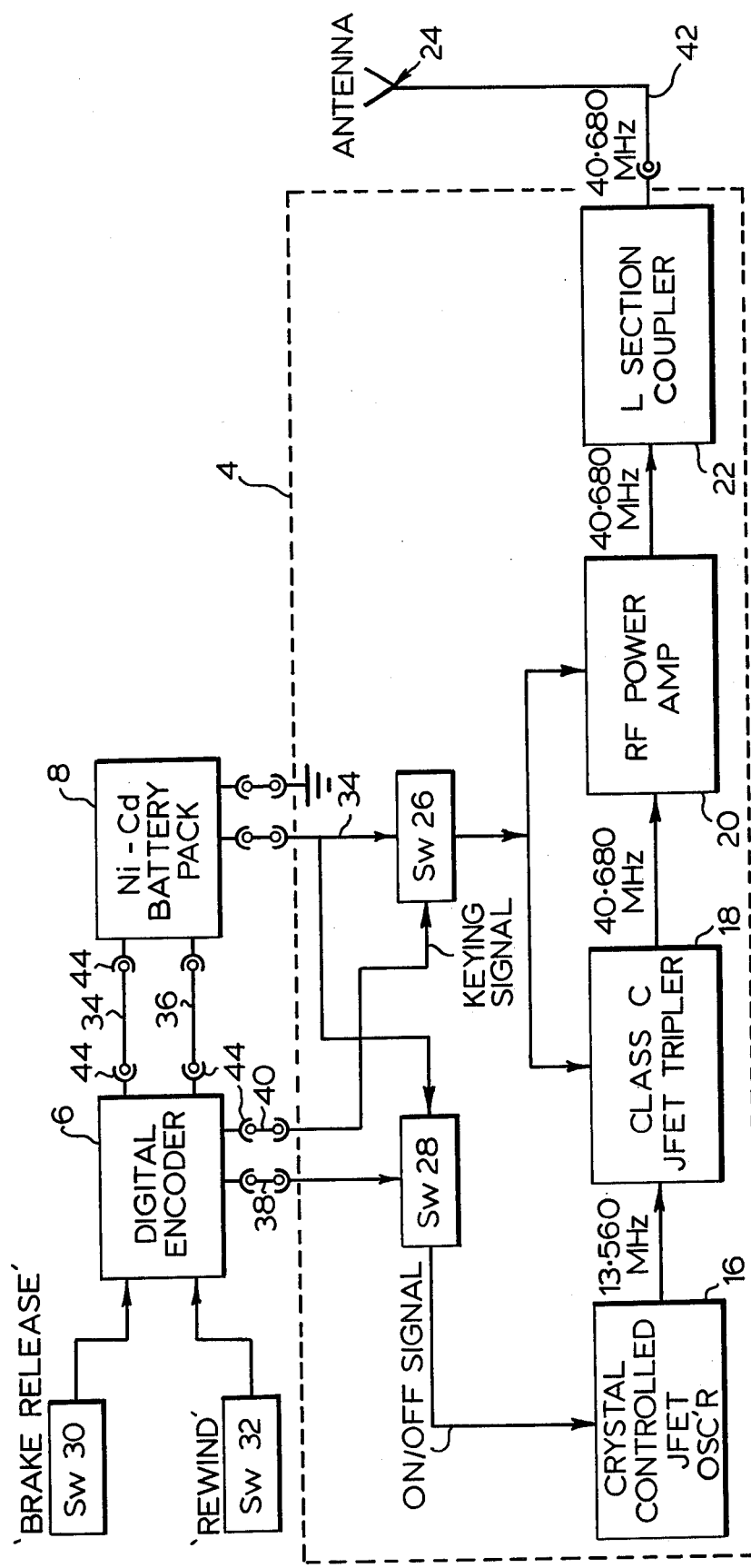

FIG. 1 shows a preferred form of the invention, in which the various components of the transmitter, described further below, are incorporated into the structure of an overvest 2 which superficially may resemble the safety vests commonly worn on construction sites and the like. Thus an outer fabric layer of the vest is preferably brightly coloured in florescent red, orange or yellow, whilst the lining may be of any appropriate fabric such as canvas. Within the lining, a number of modules 4, 6 and 8 are secured in pockets 9 in the lining, as described further below. The garment is held in place on the wearer by means of a strap 10 and a buckle 12 at the ends of a waistband 14.

Before proceeding further with the description of the mechanical construction of the transmitter, it will be convenient to consider its electronic construction as shown in FIG. 3. The basic transmitter may be quite conventional electronically, and in the example shown, a crystal controlled oscillator 16 operating at 13.560 MHz drives a class C tripler 18, which in turn drives an RF power amplifier 20, the output of which at 40.680 MHz is matched to an antenna 24 through an L-section coupler 22. It should be understood that the frequencies quoted are exemplary only and will depend in practice upon the frequency allocations available for this type of remote control operation. However, the use of approximately the VHF portion of the frequency spectrum is preferred so as to facilitate the use of antenna structures of reasonable dimensions, without the very high rate of absorption by solid bodies (such as the body of the user) which occurs at UHF.

The transmitter is very simply modulated by keying a power supply to the tripler 18 and the amplifier 20 by means of an electronic switch 26. The power supply itself is formed by battery cells contained in the modules 8 (only one module is shown in FIG. 3), described further below. The power supply to the oscillator 16 is controlled by a further electronic switch 28. The circuit blocks 16, 18, 20, 22, 26 and 28 are all embodied in the module 4, referred to for convenience as the transmitter module.

The switches 26 and 28 are controlled by outputs from a digital encoder embodied in the module 6, referred to for convenience as the encoder module. The encoder module generates one of two different digital pulse trains in accordance with which of two switches 30, 32 is actuated out of a normal condition. In a preferred arrangement, the encoder generates trains of pulses at a predetermined repetition rate, the number of pulses in each train being different according to which switch is depressed. The number of pulses in each train and/or the repetition rate is also different for different transmitters likely to be used in proximity to one another, so as to enable these to be differentiated by appropriately equipped receivers. Thus in one transmitter, the actuation of one switch may cause the encoder to generate repeated trains each of three pulses, and the second switch may cause it to generate repeated trains of six pulses. In a different transmitter, the pulse trains may contain for example five or ten pulses depending upon which switch is actuated. The encoder may comprise, as shown in FIG. 4, an oscillator 60 running at some convenient frequency, for example 5 KHz, a multistage counter 62, selection logic 64 receiving the outputs of the counter stages and controlled by the switches 30, 32 so as to provide an output signal during each cycle of the counter enabling a gate 66 to pass the correct number of pulses from the oscillator to the control input of the switch 26 via a driver amplifier 72. The encoder also includes a gate 68 connected so that the actuation of either switch 30, 32 results in the application, via a driver amplifier 70, of a signal at the control input of the switch 28, so that the oscillator 16 runs continuously during actuation of either switch, thus reducing power consumption by powering the oscillator only when a signal is transmitted whilst avoiding the necessity for keying the oscillator directly. The encoder module derives its supply from the battery modules 8, and will not be described in detail since it may be readily implemented by conventional techniques using discrete circuitry or digital integrated circuits of any of several well known "families", however the use of complementary MOS integrated circuits is preferred because of their low power consumption. The switches 30 and 32 are magnetically operated reed switches. If the counter 62 is a six bit counter, a 5-KHz oscillator frequency will result in a cycle length of $0.0002 \times 2^6$ seconds, or a repetition frequency of just over 78-Hz, whilst the pulse trains may comprise theoretically from 1 to 63 pulses. In practice, the extremes of this range would not be usable, but about 50 different pulse train lengths would be usable, enabling provision of about 25 different encoders providing two encoded signals apiece without any duplication of encoded signals. Additional different encoded signals can be provided by changing the length of the count performed by the counter 62 and/or changing the oscillator frequency. By ringing these changes, an almost unlimited number of easily distinguishable encoded signals can be produced. This is advantageous since it is highly desirable that the encoded signals produced by each transmitter be unique to that transmitter: this avoids any possibility of unwanted and possibly highly dangerous operation of controlled machinery occurring due to the same signals being transmittable by two transmitters operating in the same area. In order to assist in manufacture, the use if preferred of a counter 62 and selection logic 64 which are both programmable for count length and train length respectively by the selective establishment of connections provided for in the design of the module 6.

The construction of the receiver utilized with the transmitter forms no part of the invention and may be conventional, provided that it is equipped to recognize and act upon the different signals radiated by the transmitter. With the transmitter embodiment described, the receiver should receive and demodulate the transmitted signals using any appropriate conventional techniques, and then pass them to a decoder operative to count the pulses in each successive train received. In order to avoid spurious responses, a signal to initiate an appropriate function of the equipment being controlled should not be generated until repeated reception of successive trains containing the correct number of pulses and occurring at the proper repetition rate confirms reception of the appropriate signal.

Each of the modules 4, 6 and 8 is assembled within a thin, flat, flexible encapsulation, whilst the switches 30 and 32 are formed by pairs of switches 30a, 30b and 32a, 32b connected in parallel and enclosed in the same encapsulation at opposite ends of the front face of the encoder module.

Flexible wires 34, 36, 38, 40 and 42 are sewn into the vest between its outer layer and its lining, and at their ends are connected to the one halves of connectors 44, the other halves of the connectors being mounted on the modules 4, 6 and 8. If the connectors are in the form of press studs, then they can serve both to clip the modules into place and to establish the various circuit connections between them and the connecting wiring. The antenna in the example shown comprises part of the wire 42 formed into a vertically orientated folded dipole sewn into the back of the vest, the remainder of the wire forming a balanced feeder from the coupler 22, which latter is designed to enable the physical length of the dipole to be reduced sufficiently to be accommodated within the vest. The vertical orientation ensures an omnidirectional radiation pattern, and the location of the dipole within the vest means that it is too close to the body of the user for the latter to act so as to cause a null or nulls in the radiation pattern. There will of course be attenuation of the signal radiation when the user's body is between the antenna and the receiver, but even with a transmitter of quite modest power output, for example 0.25 watt, a reliable range of several hundred yards is assured even under very adverse conditions.

The module 6 is positioned so that the switches 30a, 30b and 32a, 32b are behind visible targets 46 marked on or attached to a front brace 48 or other breast portion of the vest. The switches are actuated by means of a magnet 50 attached to a wristband 52 secured around the wrist of the user so that the magnet is on the inside of the wrist. If the wristband is worn on the right wrist, and the targets are on the left brace, or vice versa, it is easy for the user to raise the appropriate arm so that the inside of the wrist is juxtaposed with either target, as required. By using pairs of switches connected in parallel and arranged at angles to one another as shown, reliable switch actuation is ensured. When the magnetic axis of an operating magnet is substantially at right angles to a reed switch, actuation of the latter can become erratic. With the arrangement shown, in which the switches are arranged to be in approximately in lines with each end of the range of wrist alignments relative to the targets which are attainable without contortion, reliable operation of at least one switch of the pair is assured. In stating that the switches of each pair are connected in parallel, it is assumed that the switches are of the more usual normally open type. If the circuitry used is such as to require the use of normally closed switches, then these should of course be connected in series. As the magnet 50 is thus juxtaposed with one of the two targets, a switch pair 30a, 30b or 32a, 32b, as the case may be, is actuated and an appropriate signal is generated in the encoder logic, and passed to the transmitter module 4 where the keying switch 26 modulates the signal onto the output of the oscillator, the resulting output from the amplifier 20 being passed to the antenna and radiated. It will of course be appreciated that the number of switches used could be increased (the encoder being of course constructed to provide a corresponding number of different signals), and they could be disposed in alternative locations, as could the operating magnet. For example, a magnet could be strapped to the user's elbow, and the switches could be mounted on the side of the waistband. However, it is believed that the arrangement described will usually prove most convenient, particularly since it involves an easy movement which nevertheless is unlikely to be made accidentally.

The battery modules 8 may conveniently comprise a number of nickel-cadmium cells of flat disc shape connected in series by flexible wires and either sewn between layers of canvas with the addition of the appropriate connector portions, or encapsulated, together with the connector portions, in a suitable flexible potting material such as a flexible silicone resin.

The transmitter and encoder modules 4 and 6 are also flexibly encapsulated and any known means of achieving such flexible encapsulation may be employed. In one convenient arrangement, the circuit components are assembled on small printed circuit boards with the necessary interconnections established between the various boards and the connectors by means of flexible copper braid. The modules are then encapsulated in a flat layer of flexible silicone resin, and may further be enclosed if desired in a canvas outer covering to which the connectors are sewn.

The transmitter described can be operated without any necessity for manual manipulation of switches, and since it is worn as an ordinary garment, it is not cumbersome to wear, and the encapsulated modules are much less liable to accidental damage than a unit carried externally in a conventional manner. Transmission is more reliable, because of the improved predictability of the antenna radiation characteristics, and the reduced risk of accidental transmission, and the modular construction means that individual modules are very easily exchanged should a defect occur. The encapsulated modules can be made weatherproof, and are in any event protected from dampness to some extent by the garment itself. Provision may be made either for charging the battery modules 8 in situ by sewing an appropriate connector into the garment, or they may readily be removed for charging or exchanged with precharged modules. Where the transmitter is constructed as a coloured safety vest, it merely replaces a garment which it is often desirable or essential for the user to wear in any event.

Although the invention has been described with special reference to its usefulness in connection with the operation of a log-skidder, it will be evident that it will also be useful in other situations where remote control of machinery and equipment is required.

What I claim is:

1. In a radio remote control transmitter assembly, comprising an antenna and a transmitter, said transmitter comprises radio frequency means connected to the antenna to supply a radio frequency signal thereto and means to modulate the radio frequency signal supplied by the radio frequency means, said assembly further comprising switching means, a source of electrical energy, and encoder means selectively supplying any of a plurality of distinctive output signals to the modulating means in response to different conditions of said switching means, the improvement wherein the components comprised by the transmitter assembly are incorporated into the structure of a vest-type garment, and the switching means comprises a plurality of switches located on said garment at spaced locations relative by the trunk of a user, said switches being of a non-manipulatory type selectively operable to juxtaposition of a switch control means attached to a portion of the user's body movable relative to said locations on the user's trunk.

2. A transmitter according to claim 1, wherein the switches are reed switches, and said switch control means is a magnet worn on said movable portion of the user's body which is juxtaposed with said locations of the user's trunk.

3. A transmitter according to claim 2, wherein the switches are located in a breast portion of the garment, and the magnet is incorporated in a wristband.

4. A transmitter according to claim 2, wherein the reed switches each comprise a pair of adjacent reed switch elements arranged with a non-zero angle therebetween.

5. A transmitter according to claim 1, wherein the antenna is a dipole arranged vertically within the garment.

6. A transmitter according to claim 5, wherein the dipole is a folded dipole.

7. A transmitter according to claim 1, wherein the transmitter, encoder means and the energy source are incorporated in flexibly encapsulated modules.

8. A transmitter according to claim 7, wherein the modules are detachably secured within the garment, and wiring connecting the modules to one another is incorporated in the garment, releasable connectors being provided to connect the modules and the wiring.

9. A transmitter according to claim 7, wherein the energy source comprises rechargeable cells.

10. A transmitter according to claim 1 wherein the output signals supplied by the encoder are digital, and the modulator means is an electronic switch which keys the radio frequency means in response to said digital signals.

11. A transmitter according to claim 10, wherein the encoder output signals consist of repeated pulse trains, the pulse trains being of different lengths according to the condition of said switching means.

* * * * *